(12) United States Patent
Nagasaka et al.

(10) Patent No.: US 10,389,444 B2
(45) Date of Patent: Aug. 20, 2019

(54) IMAGE PROCESSING APPARATUS, IMAGE PROCESSING SYSTEM, IMAGE PROCESSING METHOD, AND RECORDING MEDIUM

(71) Applicant: CASIO COMPUTER CO., LTD., Shibuya-ku, Tokyo (JP)

(72) Inventors: Tomoaki Nagasaka, Koganei (JP); Ryohei Yamamoto, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 66 days.

(21) Appl. No.: 15/269,908

(22) Filed: Sep. 19, 2016

(65) Prior Publication Data

US 2017/0186178 A1 Jun. 29, 2017

(30) Foreign Application Priority Data

Dec. 28, 2015 (JP) ................................. 2015-256148
Jul. 8, 2016 (JP) ................................. 2016-136253

(51) Int. Cl.
*G06K 9/20* (2006.01)
*H04B 10/116* (2013.01)

(52) U.S. Cl.
CPC ................................. *H04B 10/116* (2013.01)

(58) Field of Classification Search
CPC ........... G06T 7/2033; G06T 7/00; G06T 7/20; G06T 7/207; G06T 7/215; G06T 7/246; G06T 7/248; G06T 7/251; G06T 7/292; H04B 10/116; H04B 10/118; H04B 10/114; H04B 10/1141; H04B 10/1143; H04B 10/112; H04B 10/1121; H04B 10/1123; H04B 10/1125; H04B 10/1127; H04B 10/1129; H04Q 9/00; H04Q 9/02; H04Q 9/04; H04Q 9/10; H04Q 9/12
USPC ......... 382/106–107, 100, 122–123; 434/247, 434/250, 258, 307 A, 307 R
See application file for complete search history.

(56) References Cited

U.S. PATENT DOCUMENTS 9,079,058 B2 7/2015 Sano
2005/0137782 A1* 6/2005 Shinada ............... G08G 1/0965
701/117

(Continued)

FOREIGN PATENT DOCUMENTS

JP 2009106323 A 5/2009
JP 2010118028 A 5/2010

(Continued)

*Primary Examiner* — Dwayne D Bost
*Assistant Examiner* — Stephen M Brinich
(74) *Attorney, Agent, or Firm* — Holtz, Holtz & Volek PC

(57) ABSTRACT

An image processing apparatus includes an obtainer and an acquirer. The obtainer obtains video information including video of a measurement target and a visible light signal that includes a measurement time and measurement information of the measurement target measured by a measuring apparatus attached to the measurement target, the visible light signal being transmitted by the measuring apparatus. The acquirer acquires the measurement time and the measurement information from the visible light signal included in the video information obtained by the obtainer, and synchronizes, with respect to time, the measurement information and the video information based on the measurement time acquired.

17 Claims, 11 Drawing Sheets

(56) References Cited

U.S. PATENT DOCUMENTS

2007/0140697 A1* 6/2007 Miyake .................. G08C 23/04
398/106
2009/0175594 A1* 7/2009 Ann ....................... H04N 7/025
386/357
2015/0262503 A1 9/2015 Sano

FOREIGN PATENT DOCUMENTS

| JP | 2011087794 A | 5/2011 |
| JP | 2013192591 A | 9/2013 |

\* cited by examiner

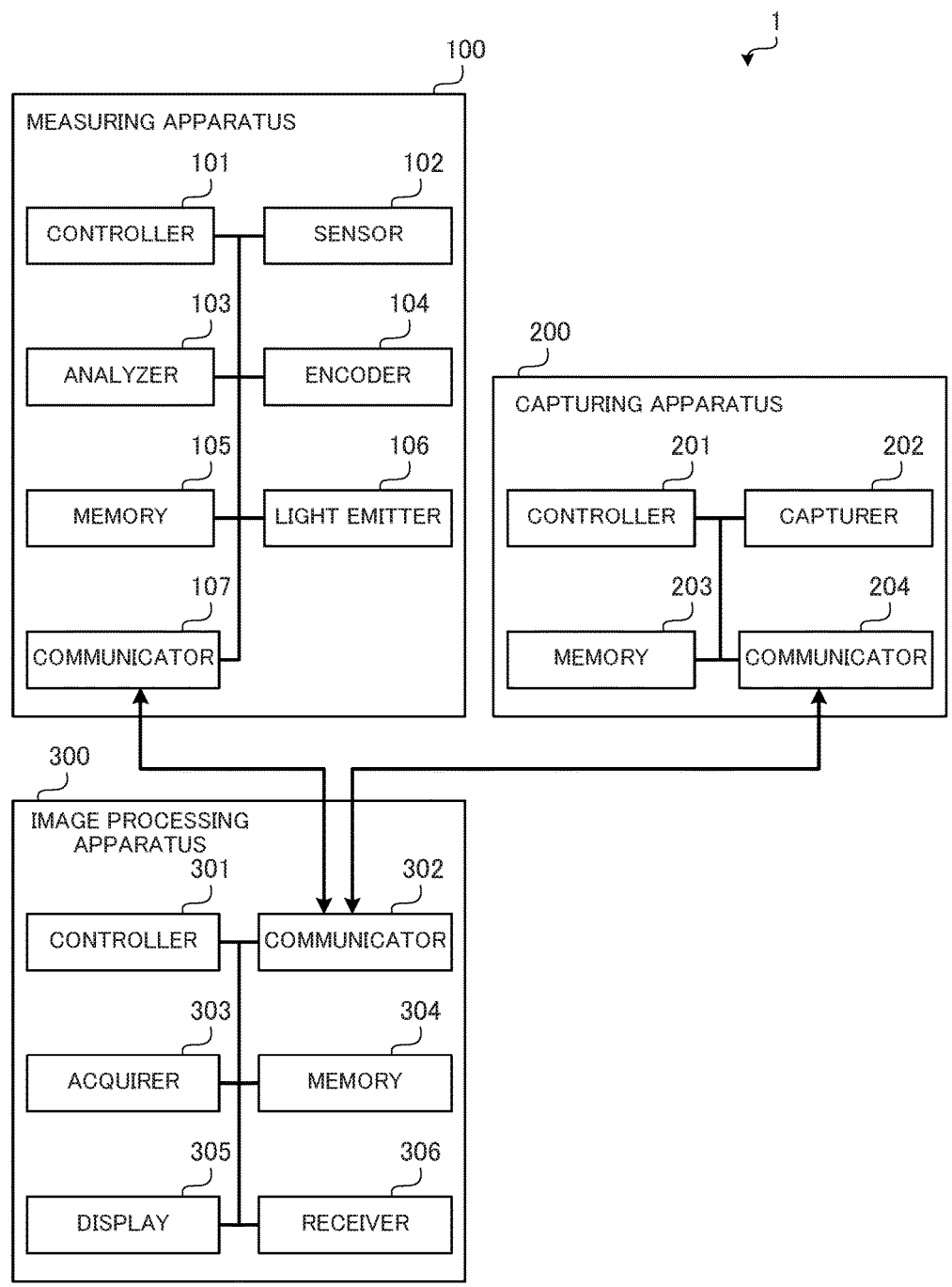

IMAGE PROCESSING APPARATUS, IMAGE PROCESSING SYSTEM, IMAGE PROCESSING METHOD, AND RECORDING MEDIUM

CROSS-REFERENCE TO RELATED APPLICATION

This application is based upon and claims the benefit of priority from the prior Japanese Patent Application No. 2015-256148 filed on Dec. 28, 2015, and the prior Japanese Patent Application No. 2016-136253 filed on Jul. 8, 2016, the entire contents of which are incorporated herein by reference.

FIELD

This application relates generally to an image processing apparatus, a measuring apparatus, an image processing system, an image processing method and a recording medium.

BACKGROUND

Videos of a measurement target are captured using capturing equipment in order to analyze movements in sports, dance and/or the like and provide coaching. Using videos offer an advantage of making a condition of surroundings of the measurement target easy to understand so that movements can be easily grasped even if special knowledge is lacking. On the other hand, there are also a disadvantage that only large movements seen with eyes can be grasped, and quantitative evaluation is difficult.

In addition, wearable sensors are also used, similar to the capturing equipment. Using wearable sensors offers the advantages that acquiring information not seen by the eye and quantitatively evaluating the movement are easy. On the other hand, there is also the disadvantage that the special knowledge is necessary in data analysis, and the surroundings of the measurement target are difficult to grasp.

Thus, the capturing equipment and the wearable sensors mutually complementing each other's disadvantages becomes possible, and using these together enables effective movement analysis and coaching. In the disclosure of Unexamined Japanese Patent Application Kokai Publication No. 2009-106323, an apparatus is disclosed that captures video images showing a state of a target individual's swing with a video camera while also causing the target individual to wear an acceleration sensor, and displays on a display the video images along with an image with a mark at a maximum peak of a time waveform of acceleration detected by the acceleration sensor.

SUMMARY

An image processing apparatus according to the present disclosure comprises:

an obtainer for obtaining video information including video of a measurement target and a visible light signal that includes measurement information for the measurement target measured by a measuring apparatus attached to the measurement target, the visible light signal being transmitted by the measuring apparatus; and an acquirer for acquiring the measurement information from the visible light signal included in the video information obtained by the obtainer.

A measuring apparatus according to the present disclosure comprises:

a measurer attached to a measurement target, for measuring measurement information of the measurement target; and a light emitter for transmitting a visible light signal including the measurement information measured by the measurer;

wherein the measurer measures geomagnetism and acquires an angular displacement of the measurement target; and the light emitter transmits the visible light signal when the angular displacement does not exceed a threshold value, and does not transmit the visible light signal when the angular displacement exceeds the threshold value.

An image processing system according to the present disclosure comprises:

a measuring apparatus attached to a measurement target, for measuring measurement information of the measurement target and transmitting a visible light signal including the measurement information measured; and an image processing apparatus including an obtainer for obtaining video information that includes the visible light signal and video of the measurement target, and an acquirer for acquiring the measurement information from the visible light signal included in the video information obtained by the obtainer.

An image processing method according to the present disclosure includes:

obtaining video information including video of a measurement target and a visible light signal that includes measurement information for the measurement target measured by a measuring apparatus attached to the measurement target, the visible light signal being transmitted by the measuring apparatus; and acquiring the measurement information from the visible light signal included in the video information obtained.

A non-transitory computer-readable recording medium according to the present disclosure is a non-transitory computer-readable recording medium on which is recorded a program for causing image processing executed in an image processing apparatus to be realized with a computer, the recording medium causing the computer to execute: an obtaining process for obtaining video information including video of a measurement target and a visible light signal possessing measurement information for the measurement target measured by a measuring apparatus attached to the measurement target, the visible light signal being transmitted by the measuring apparatus; and an acquiring process for acquiring the measurement information from the visible light signal included in the video information obtained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

A more complete understanding of this application can be obtained when the following detailed description is considered in conjunction with the following drawings, in which:

FIG. 2 is a block diagram showing a configuration of the image processing system according to the first exemplary embodiment;

DETAILED DESCRIPTION (First Exemplary Embodiment)

Figure 1:
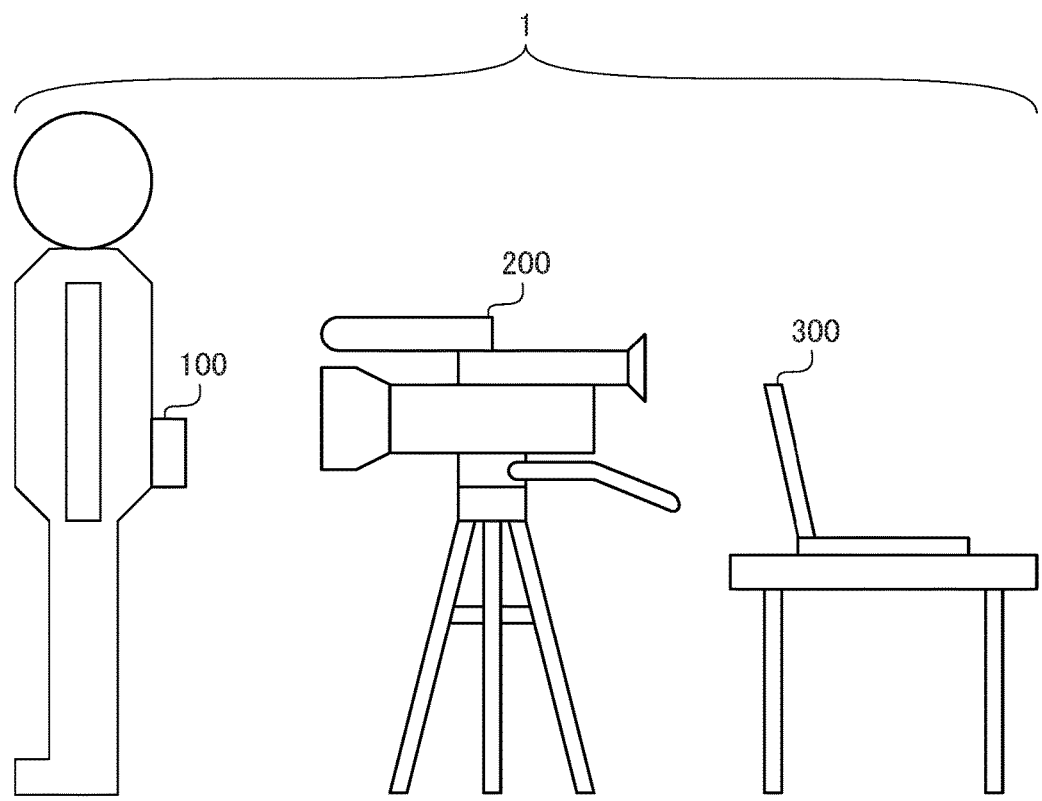
FIG. 1 is a schematic drawing showing a configuration of an image processing system according to a first exemplary embodiment.

Below, an image processing system 1 according to a first exemplary embodiment of the present disclosure is described with reference to the drawings. Same or corresponding parts in the drawings are labeled with the same reference symbols.

FIG. 1 is a schematic drawing showing a configuration of the image processing system 1 according to the first exemplary embodiment, and FIG. 2 is a block diagram showing a configuration of the image processing system 1. As shown in FIG. 1 and FIG. 2, the image processing system 1 comprises a measuring apparatus 100, a capturing apparatus 200 and an image processing apparatus 300.

The measuring apparatus 100 is a wearable sensor attached to a measurement target. The measuring apparatus 100 comprises a controller 101, a sensor 102, an analyzer 103, an encoder 104, a memory 105, a light emitter 106 and a communicator 107.

The controller 101 is a processing device that controls the measuring apparatus 100 by executing programs. The controller 101 may include a central processing unit (CPU).

The sensor 102 is a sensor that measures movement information or biological information about the measurement target, or environmental information around the measurement target, and acquires data (measurement information). The sensor 102 may include a velocity sensor, an acceleration sensor, an angular velocity sensor, a heart rate sensor, a blood pressure sensor and/or an air pressure sensor. The sensor 102 functions as a measurer.

The analyzer 103 analyzes data acquired by the sensor 102, and calculates evaluation values evaluating the movement information or the biological information about the measurement target, or the environment information around the measurement target (evaluation value of the movement information, evaluation value of the biological information, evaluation value of the environment information). The analyzer 103 may include a CPU. Included in the evaluation value of the movement information calculated by the analyzer 103 are the velocity of the measurement target, an activity level (energy) calculated from the weight and the velocity of the measurement target, calories consumed calculated from the activity level, and a stability level expressing the smallness of the velocity and the acceleration.

The encoder 104 encodes information and generates a signal. The encoder 104 may include a CPU. A visible light signal 400 that the encoder 140 encodes and generates may include a time that the measuring apparatus 100 and sensor 102 accomplished measurements, and the evaluation values calculated by the analyzer 103, and is described in detail below.

The memory 105 is a memory device that stores the data acquired by the sensor 102, the evaluation values calculated by the analyzer 103 and the signals generated by the encoder 104. In addition, the memory 105 functions as a memory area when the controller 101 is executing a process. The memory 105 may include a random access memory (RAM), a flash memory and/or a magnetic disk.

The light emitter 106 is a visible light emitting device that is a transmitter of visible light communication. The light emitter 106 transmits the visible light signal 400 encoded by the encoder 104, for example using a flashing pattern that repeats turning on and turning off of visible light. The light emitter 106 may include a light emitting diode (LED). In addition, the light emitter 106 may transmit the visible light signal 400 encoded by the encoder 104, using a plurality of LEDs that emit light with differing wavelengths. By using the plurality of LEDs that emit light with differing wavelengths, increasing an amount of information transmitted becomes possible.

The communicator 107 is a communication device for accomplishing wireless communication with the image processing apparatus 300. The communicator 107 accomplishes transmission of signals transmission of which is difficult with visible light communications via the light emitter 106 because the amount of information is large, including data measured by the sensor 102. The communicator 107 may include a Bluetooth® module and/or a wireless local area network (LAN) module, and a control circuit for controlling such.

The capturing apparatus 200 is a capturing apparatus that captures the measurement target and stores video information. The video information includes the visible light signal 400 having measurement information about the measurement target measured by the measuring apparatus 100 and transmitted by the measuring apparatus 100, and video of the measurement target. The capturing apparatus 200 comprises a controller 201, a capturer 202, a memory 203 and a communicator 204. The capturing apparatus 200 may include a video camera and/or a camera-equipped mobile phone.

The controller 201 controls the capturing apparatus 200 by executing programs. The controller 201 may include a CPU.

The capturer 202 acquires the video information by capturing the measurement target. The capturer 202 may include a lens, a complementary metal oxide semiconductor (CMOS) image sensor, a charge-coupled device (CCD) image sensor and/or an analog-digital (A/D) converter. In the present disclosure, the description assumes as one example a frames-per-second (fps) count for the video information captured by the capturer 202 is 30 fps. The capturer 202 also functions as an obtainer.

The memory 203 is a memory device that stores data including the video information acquired by the capturer 202. In addition, the memory 203 functions as a memory area when the controller 201 is executing processes. The memory 203 may include a RAM, a flash memory and/or a magnetic disk.

The communicator 204 is a communication apparatus for accomplishing wireless communication with the image processing apparatus 300. The communicator 204 accomplishes transmission of data including the video information acquired by the capturer 202 and stored by the memory 203. The communicator 204 may include a Bluetooth module and/or a wireless LAN module, and a control circuit for controlling such.

The image processing apparatus 300 is an apparatus for synchronizing and displaying the video information of the measurement target and measured data. The image processing apparatus 300 comprises a controller 301, a communicator 302, an acquirer 303, a memory 304, a display 305 and a receiver 306. The image processing apparatus 300 may include a server, a personal computer and/or a smartphone.

The controller 301 is a processing device that controls the image processing apparatus 300 by executing programs. The controller 301 may include a CPU.

The communicator 302 is a communication device for accomplishing wireless communication with the measuring apparatus 100 and the capturing apparatus 200. The communicator 302 receives signals sent by the communicator 107 of the measuring apparatus 100 and the communicator 204 of the capturing apparatus 200. The communicator 302 may include a Bluetooth® module and/or a wireless LAN module, and control circuits for controlling such. The communicator 302 functions as an obtainer or a receiver.

The acquirer 303 acquires information by decoding signals of the visible light communication in which video images are recorded. In addition, the acquirer 303 accomplishes time synchronization. The acquirer 303 may include a CPU. The acquirer 303 specifies a light-emission pattern of the light emitter 106 of the measuring apparatus 100 from the video information captured by the capturing apparatus 200 and transmitted to the image processing apparatus 300, and acquires data by decoding the light-emission pattern. Furthermore, the acquirer 303 accomplishes the time synchronization by means of a below-described method.

Figure 3A:
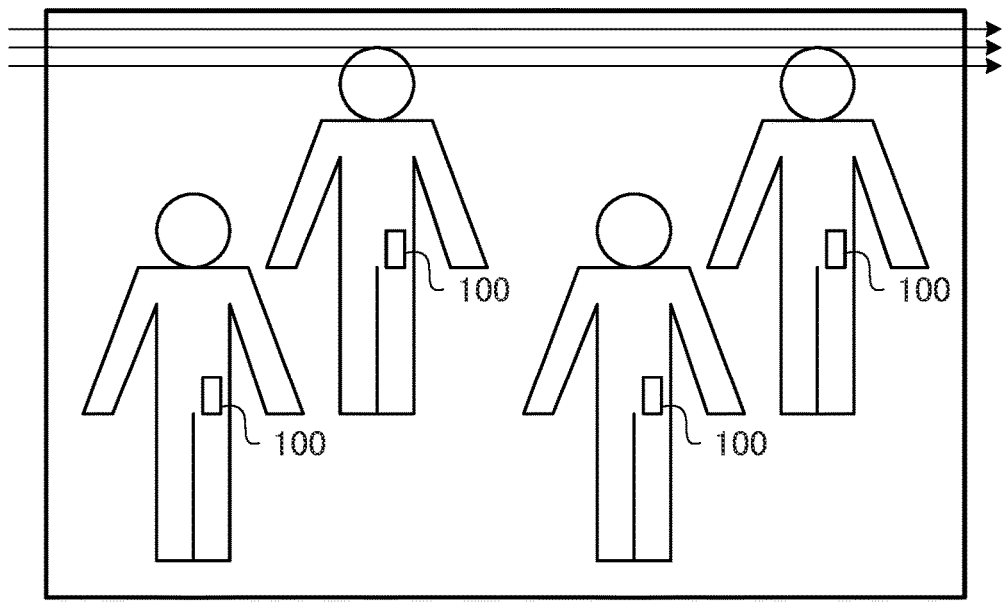
FIG. 3A is a drawing for describing a method by which an acquirer according to the first exemplary embodiment searches for a signal.
Figure 3B:
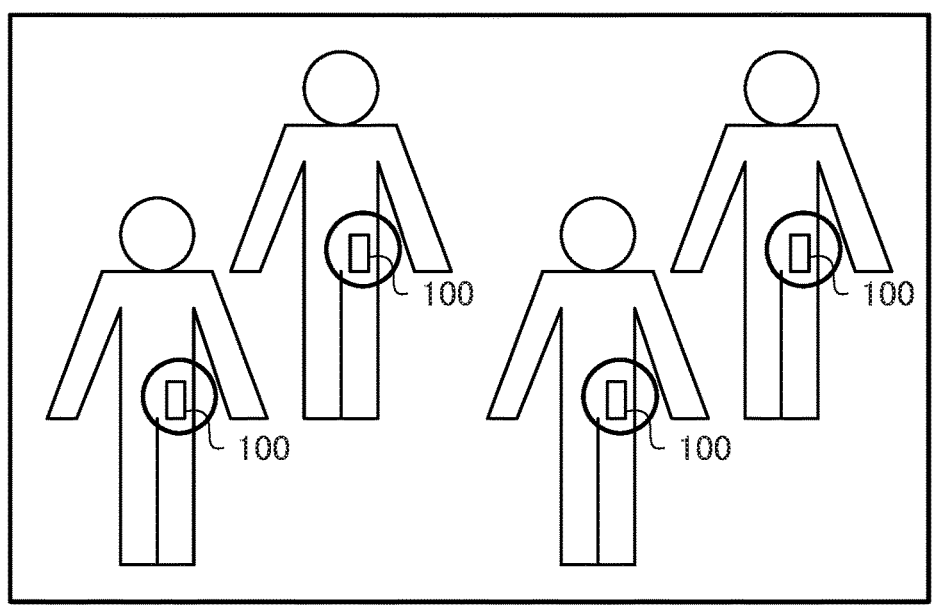
FIG. 3B is a drawing for describing a method by which the acquirer according to the first exemplary embodiment specifies a signal.

The method by which the acquirer 303 specifies the signal emitted by the light emitter 106 from the video information will be described. FIG. 3A and FIG. 3B are drawings for describing the method by which the acquirer 303 specifies the signal. As shown in FIG. 3A, the acquirer 303 searches (scans) for colors corresponding to emitted light from the light emitter 106, from the entire image of one frame of the video information. The wavelength of emitted light from the light emitter 106, and white balance and sensitivity of the capturing apparatus 200, are commonly known, and the colors corresponding to the light emitted from the light emitter 106 are uniquely determined from this information.

When the colors corresponding to the emitted light from the light emitter 106 are discovered, as shown in FIG. 3B the acquirer 303 specifies that a position where the color was discovered is a position of a measuring apparatus 100, and traces all of specified positions of the measuring apparatuses 100. Following this, the absence or the presence of emitted light at the respective positions of the measuring apparatuses 100 is acquired for each frame of the video information, and the acquired pattern of emitted light is specified as a signal transmitted by the light emitter 106 of the measuring apparatus 100.

As noted above, in order to acquire the absence or the presence of emitted light of the light emitter 106 for each frame of video information, ideally one frame of the video information corresponds to one bit of signal. Accordingly, the communication speed (bps) of the visible light communication accomplished by the image processing system 1 ideally matches the frame count per second (fps) of the video information captured by the capturing apparatus 200. In the example of this specification, the video information is at 30 fps, so the communication speed of the visible light communication is 30 bps.

The memory 304 is a memory device that stores the video information and data received by the communicator 302, and data decoded by the acquirer 303. In addition, the memory 304 functions as a memory area when the controller 301 is executing processes. The memory 304 may include a RAM and/or a flash memory.

The display 305 is a display device for displaying the video information and data to a user. The display 305 displays the video information in which the movements of the measurement target are recorded, received by the communicator 302. In addition, the display 305 displays data received by the communicator 302 or decoded by the acquirer 303. Furthermore, the display 305 can accomplish highlighting of the part in the screen where a specific measuring apparatus 100 is positioned. The display 305 may include a liquid crystal display and/or a cathode ray tube (CRT) display. The screen display accomplished by the display 305 is described below.

The receiver 306 functions as a user interface and is a receiving device for receiving user instructions. Via the receiver 306, the user inputs commands selecting the specific measuring device 100 on the screen. The receiver 306 may include a mouse, a touchpad and/or a touch panel.

The visible light signal 400 encoded by the encoder 104 and transmitted by the light emitter 106 will be explained with reference to the drawings.

Figure 4:
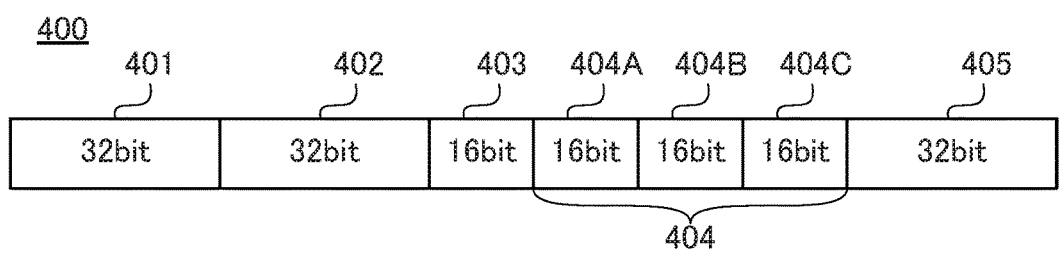
FIG. 4 is a drawing showing a configuration of a visible light signal according to the first exemplary embodiment.

FIG. 4 is a drawing showing a configuration of the visible light signal 400. As shown in FIG. 4, the visible light signal 400 includes a header flag 401, a measurement time 402, a sensor ID 403, analysis data 404 and an alert flag 405.

The header flag 401 is a 32-bit signal indicating a start of the visible light signal 400. The header flag 401 is included at a head of the visible light signal 400, and the acquirer 303 recognizes that the visible light signal 400 has started through the header flag 401 being present.

The measurement time 402 is a 32-bit signal (measurement signal) indicating an elapsed time from when the measuring apparatus 100 that transmitted the visible light signal 400 starting measuring. More specifically, the measurement time 402 indicates the elapsed time from when the measuring apparatus 100 began measuring until the first light emission of the header flag 401.

Figure 5:
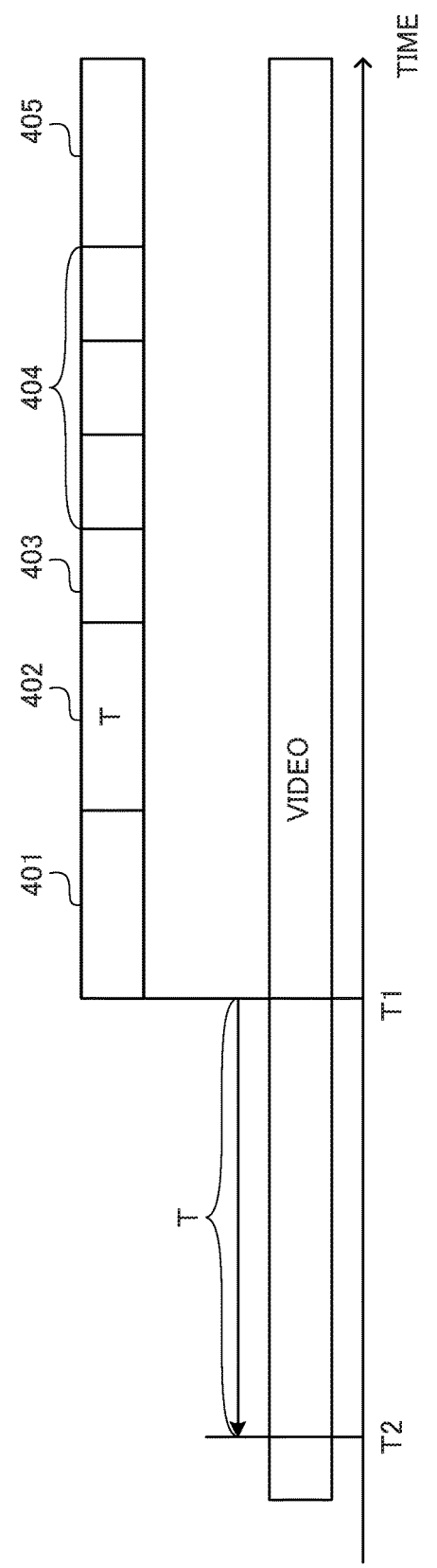
FIG. 5 is a drawing for describing time synchronization accomplished by the acquirer according to the first exemplary embodiment.

FIG. 5 is a drawing for describing time synchronization accomplished by the acquirer 303. The acquirer 303 accomplishes time synchronization between the data measured by the measuring apparatus 100 and the video information captured by the capturing apparatus 200, from the frames of the video information in which light emission was recorded and the time indicated by the measurement time 402.

The acquirer 303 acquires the measurement time 402. In the example of FIG. 5, the elapsed time indicated by the measurement time 402 is T seconds. A time (T2) back in time by the elapsed time T seconds indicated by the measurement time 402 from a capturing time (T1) of the frame of the video information in which the initial light emission of the header flag 401 of the visible light signal 400 including the measurement time 402 is recorded is specified. This time is the time at which the measurement apparatus 100 began measuring, and the time synchronization is accomplished by specifying the frame captured at that time.

Returning to FIG. 4, the sensor ID 403 is a 16-bit signal unique to the measurement apparatus 100 that transmitted the visible light signal 400, and is a specific signal specifying the measurement apparatus 100. Even when multiple measurement apparatuses 100 are respectively mounted on measurement targets, the acquirer 303 specifies the measurement apparatus 100 that transmitted the visible light signal 400 from the sensor ID 403.

The analysis data 404 is a 16-bit signal (evaluation signal) indicating the evaluation value obtained by the analyzer 103 of the measuring apparatus 100 through analysis of data. The analysis data 404 is included in plurality in the visible light signal 400, and in the example of FIG. 4, three items of analysis data 404A, 404B and 404C are included.

The alert flag 405 is a 32-bit signal (alert signal) indicating a flag output when the evaluation analyzed and obtained by the analyzer 103 of the measuring apparatus 100 exceeds a threshold value. The alert flag 405 includes information indicating which among a plurality of evaluation values exceeds the threshold value.

The visible light signal 400 overall is a 160-bit signal, and with the communication speed of 30 bps of this exemplary embodiment, communication is completed in 5.3 seconds.

Figure 6:
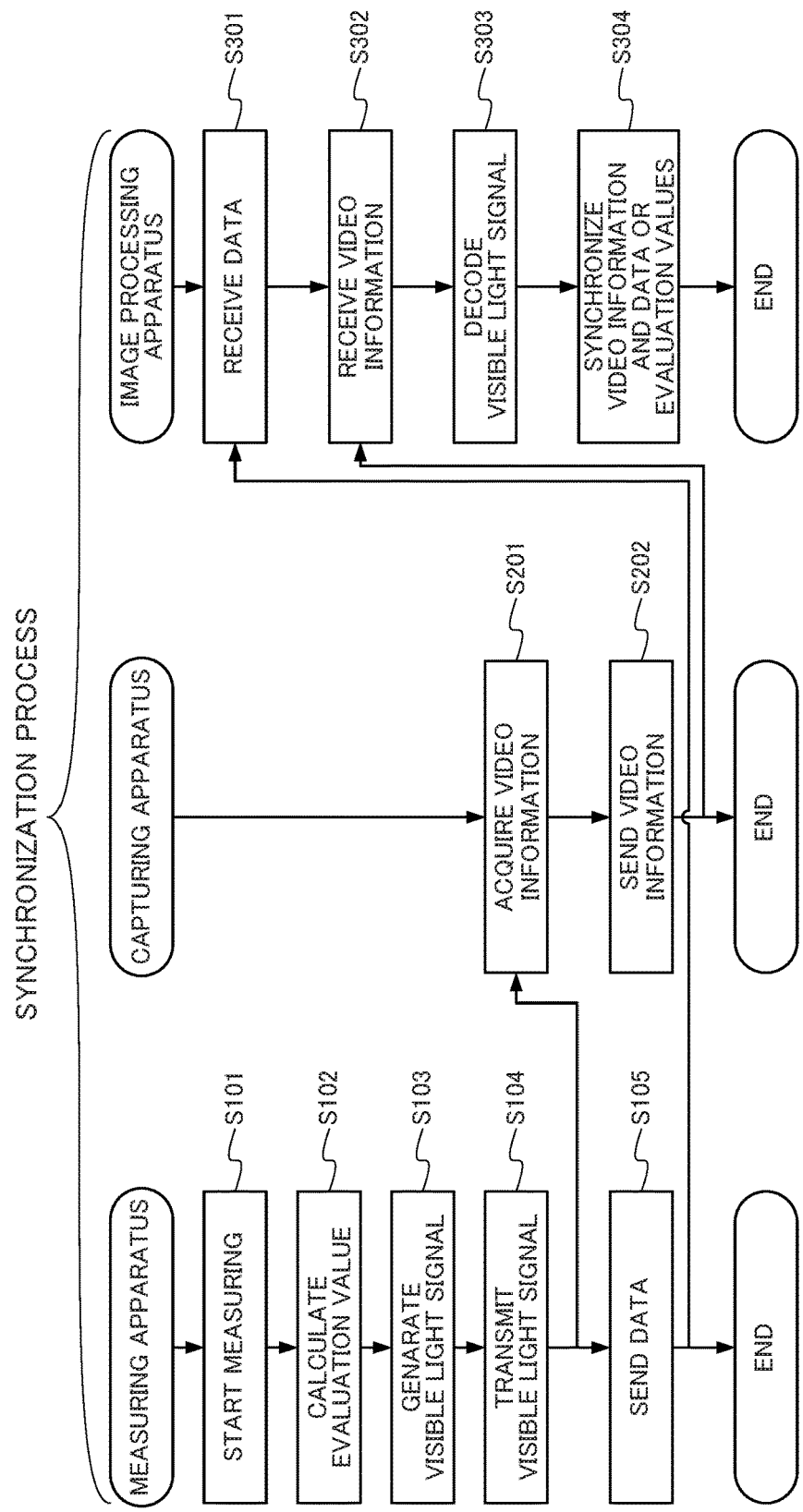
FIG. 6 is a flowchart showing a synchronization process according to the first exemplary embodiment.

FIG. 6 is a flowchart showing a synchronization process as image processing. The synchronization process executed by the image processing system 1 will be described with reference to the flowchart in FIG. 6.

An action of the measuring apparatus 100 will be described. When the start of measurements is commanded by the controller 101, the sensor 102 starts measuring the measurement target (step S101). Data measured is stored in the memory 105.

When measurement of data begins, the analyzer 103 analyzes the data and calculates evaluation values (step S102). The calculated evaluation values are stored in the memory 105.

When the evaluation values are calculated, the encoder 104 encodes information and starts generating the visible light signal 400 (step S103). The generated visible light signal 400 is stored in the memory 105.

When the visible light signal 400 is generated, the light emitter 106 transmits the visible light signal 400 by flashing (step S104).

When the visible light signal 400 is transmitted, the communicator 107 sends the data measured by the sensor 102 to the image processing apparatus 300 (step S105). The position where step S105 is executed is arbitrary, and this step may be accomplished prior to step S101 or may be accomplished in parallel with step S101 through step S104.

When step S101 through step S105 conclude, the measuring apparatus 100 ends the action.

The action of the capturing apparatus 200 will be described. When a start of capturing is commanded by the controller 201, the capturer 202 captures the measurement target and acquires the video information (step S201). The visible light signal 400 transmitted by the light emitter 106 of the measuring apparatus 100 is simultaneously captured. The acquired video information is stored in the memory 203. Step S201 need not be accomplished after step S104 in which the light emitter 106 transmits the visible light signal 400, but transmission of the visible light signal 400 (step S104) may be started during capturing of video information (that is to say, during execution of step S201).

When the video information is acquired, the communicator 204 transmits the video information acquired by the capturer 202 to the image processing apparatus 300 (step S202).

When step S201 to step S202 concludes, the capturing apparatus 200 ends the action.

The action of the image processing apparatus 300 will be described. When the data is transmitted in step S105, the communicator 203 receives the transmitted data (step S301). The data received is stored in the memory 304.

When the video is transmitted in step S202, the communicator 302 receives the transmitted video information (step S302). The video received is stored in the memory 304.

When the video is received, the acquirer 303 specifies the visible light signal 400 recorded in the video and accomplishes decoding (step S303). The information obtained by decoding is stored in the memory 304. Step S302 and step S303 may be accomplished prior to step S301, or may be accomplished in parallel with step S301.

When the data and the video information are received and the visible light signal 400 is decoded and the information is received, the acquirer 303 accomplishes the time synchronization of the video information and the data or the evaluation values (step S304). The time synchronization is accomplished from the measurement time 402 and the frame of the video information in which a signal indicating this measurement time 402 was recorded. The synchronized video information and data or evaluation values are associated with each other and stored in the memory 304.

When step S301 through step S304 conclude, the action of the image processing apparatus 300 ends.

When the measuring apparatus 100, the capturing apparatus 200 and the image processing apparatus 300 end their actions, the image processing system 1 ends the synchronization process.

A screen display accomplished by the display 305 will be described in detail.

Figure 7:
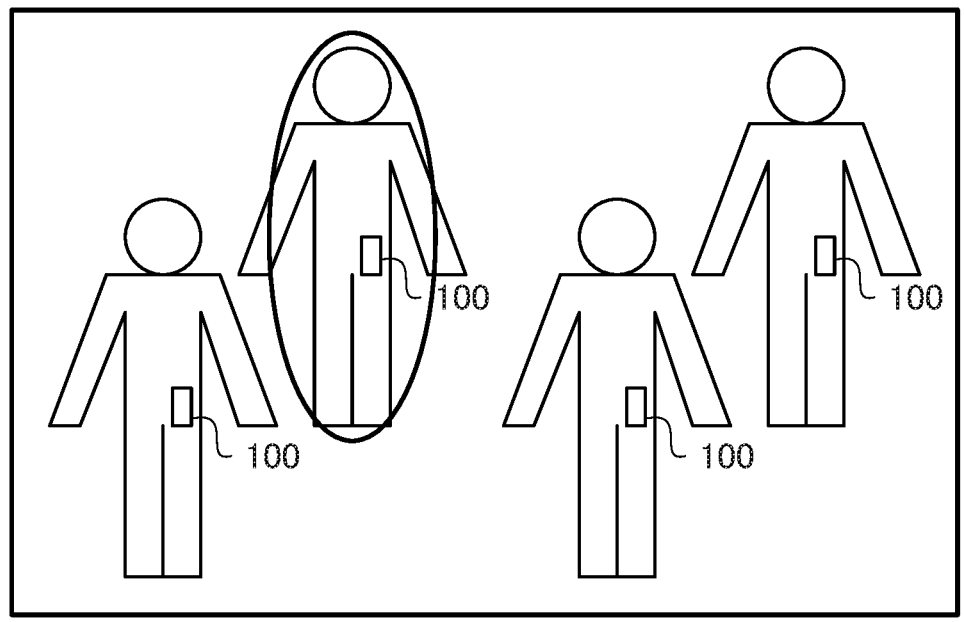
FIG. 7 is a drawing showing a screen displayed by a display according to the first exemplary embodiment.

FIGS. 7, 8A, 8B, 9A and 9B are drawings showing screens displayed by the display 305. As shown in FIG. 7, when the alert flag 405 is included in the visible light signal 400 sent by the measuring apparatus 100, the display 305 accomplishes a highlighted display of the portion where the measuring apparatus 100 is positioned, on the screen. The highlighted display is accomplished by surrounding the portion where the measuring apparatus 100 is positioned with an ellipse. A highlighted display using the ellipse is one example, but highlighting may be accomplished through various methods, such as indicating with an arrow, changing brightness and/or the like.

If the threshold value is set so that the evaluation value exceeds the threshold value when the movement information of the measurement target exceeds an appropriate range, when the biological information of the measurement target exceeds a suitable range, or when the environment information surrounding the measurement target exceeds an appropriate range, the measuring apparatus 100 mounted on the measurement target is displayed highlighted when the movement information of the measurement target is inappropriate, when the biological information of the measurement target is inappropriate or when the environment information surrounding the measurement target is inappropriate. In this manner, elucidation of the measurement targets to which the user should pay attention among a plurality of measurement targets becomes possible, so accomplishing efficient guidance becomes possible.

Figure 8A:
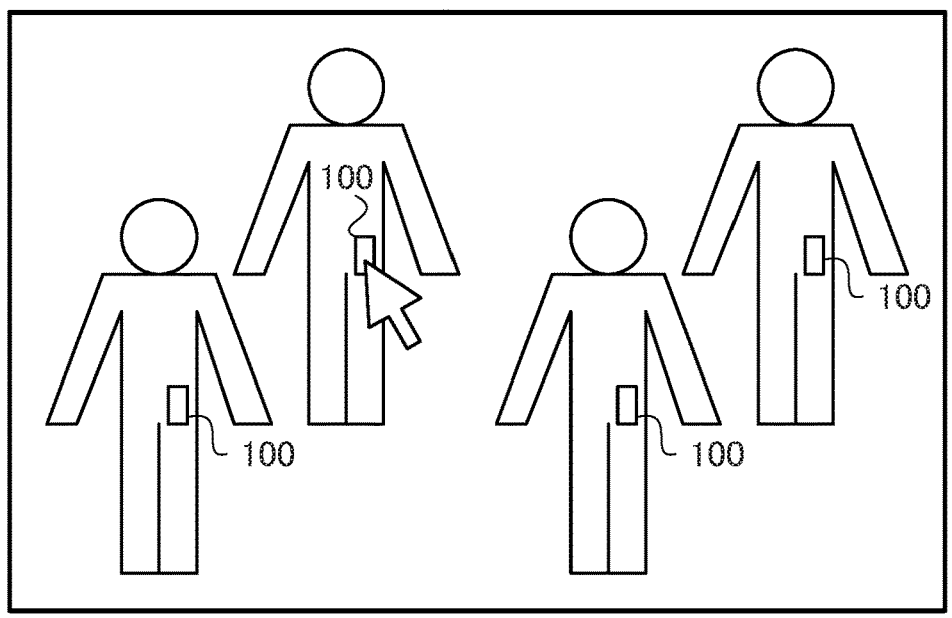
FIG. 8A is a drawing showing an example of selecting a measurement target, on the screen displayed by the display according to the first exemplary embodiment.
Figure 8B:
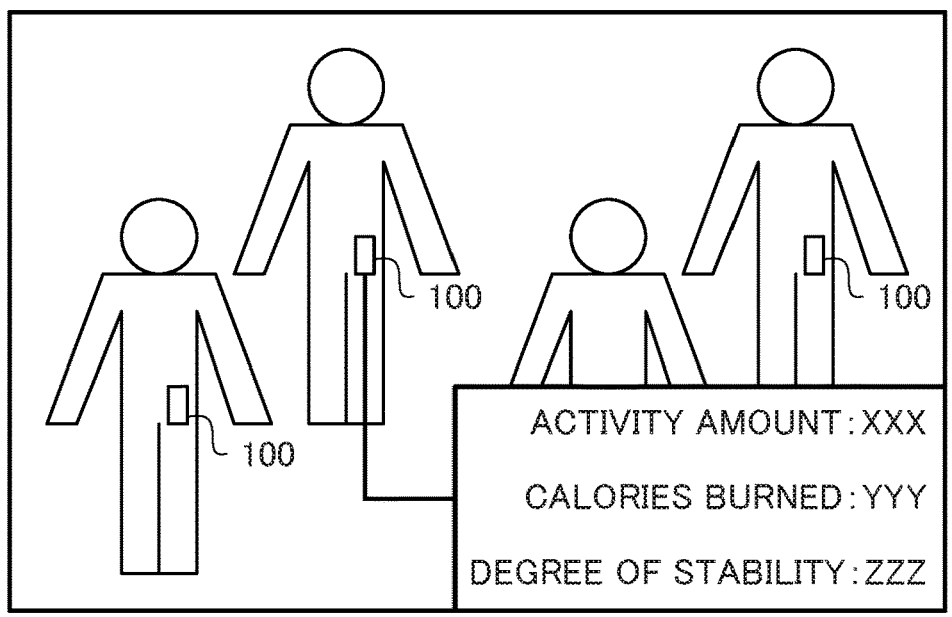
FIG. 8B is a drawing showing an example of displaying an evaluation value, on the screen displayed by the display according to the first exemplary embodiment.

As shown in FIGS. 8A and 8B, the display 305 simultaneously displays the evaluation values included in the analysis data 404 sent by the measuring apparatus 100 and the video information sent by the capturing apparatus 200, either overlapping or lined up on the screen. As shown in FIG. 8A, when the user selects via the receiver 306 the measuring apparatus 100 on the screen or the measurement target on which the measuring apparatus 100 is mounted, the acquirer 303 acquires the elapsed time information from the measurement time 402 sent by the measuring apparatus 100, and acquires the evaluation values from the analysis data 404. The controller 301 controls the display 305 after the synchronization process was accomplished, and displays the evaluation values and the video information on the screen overlapping or lined up, as shown in FIG. 8B.

For example, the evaluation value of the movement information is an indicator with which the user can more easily understand effects of movement than with the data itself, and by computing the evaluation value, the efficient guidance can be given to the user. Because the analysis data 404 can be acquired from the measuring apparatus 100 on the screen, associating the measuring apparatus 100 and the evaluation value with each other is easy. In addition, accomplishing the display of the evaluation value through the visible light communication alone becomes possible, and the wireless communication via the communicator 107 and the communicator 302 is unnecessary, so data management becomes easy.

Figure 9A:
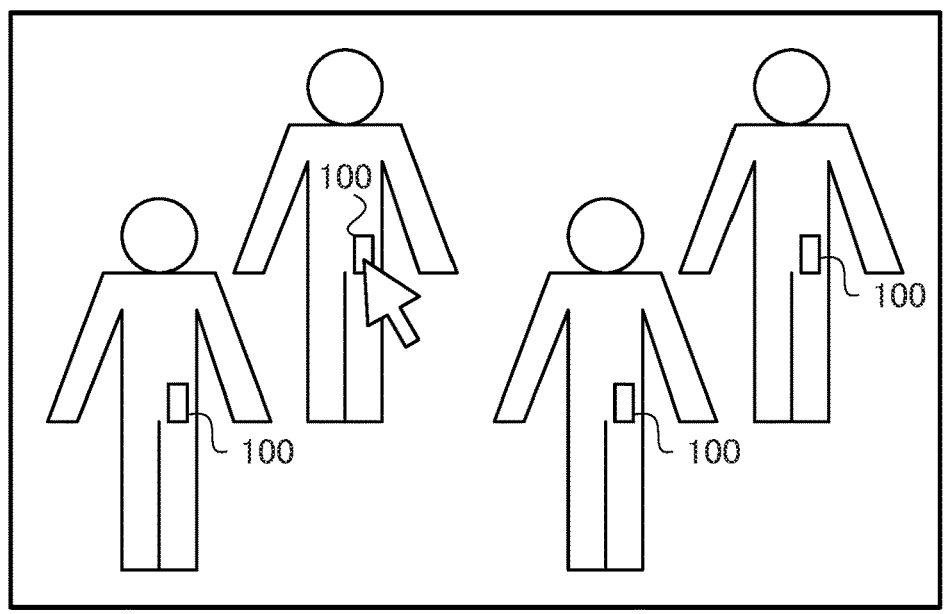
FIG. 9A is a drawing showing an example of selecting the measurement target, on the screen displayed by the display according to the first exemplary embodiment.
Figure 9B:
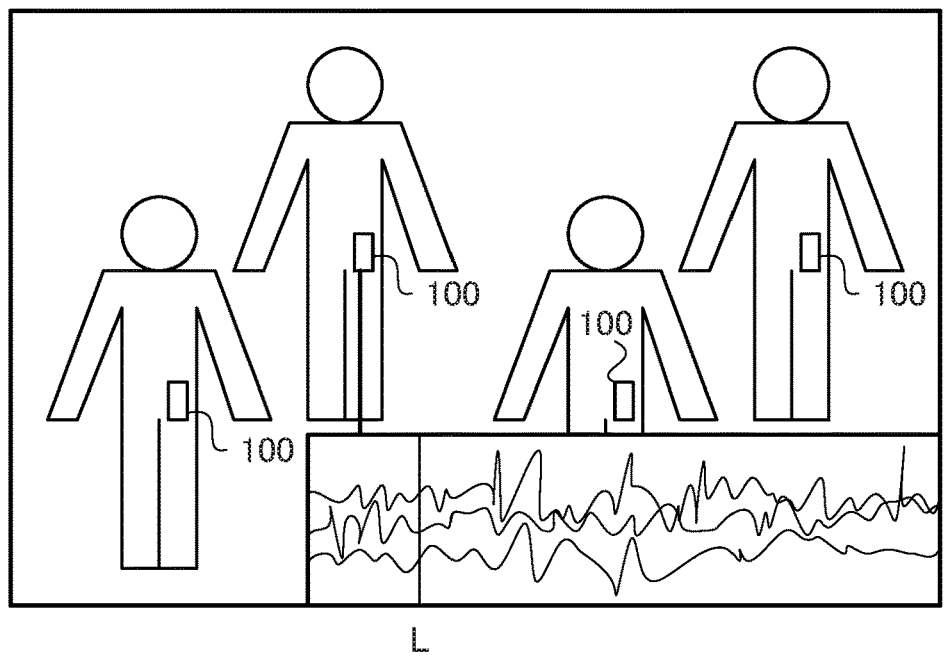
FIG. 9B is a drawing showing an example of displaying data, on the screen displayed by the display according to the first exemplary embodiment.

As shown in FIGS. 9A and 9B, the display 305 displays the data sent by the measuring apparatus 100 via the communicator 107 and the video sent by the capturing apparatus 200 via the communicator 204, simultaneously on the screen, overlapped or lined up. As shown in FIG. 9A, when the user selects via the receiver 306 the measuring apparatus 100 on the screen or the measurement target on which the measuring apparatus 100 is mounted, the acquirer 303 acquires the elapsed time information from the measurement time 402 transmitted by the measuring apparatus 100 and acquires information specifying the measuring apparatus 100 from the sensor ID 403. The controller 301 acquires, from the memory 304, the data sent by the measuring apparatus 100 via the communicator 107, controls the display 305 after synchronization processing is accomplished, and simultaneously displays the data and the video information on the screen overlapping or lined up, as shown in FIG. 9B. The time of the data corresponding to the time on the video information displayed is indicated by a line L.

By accomplishing the wireless communication via the communicator 107 and the communicator 302, accomplishing more detailed evaluation of movements of the measurement target becomes possible using large amount of data, the sending and the receiving of which is difficult with visible light communication.

As noted above, with the image processing system 1 according to this exemplary embodiment, the image processing apparatus 300 receives video information captured by the capturing apparatus 200, and through this can acquire the measurement information (the movement information, the biological information or the environment information) based on data measured by the measuring apparatus 100. Because the measurement information can be acquired by receiving the video information, sending and receiving of data can be accomplished without using a wireless transmitter.

With the image processing system 1, the data measured by the measuring apparatus 100 and the video information captured by the capturing apparatus 200 can be time-synchronized in one-frame units. By accomplishing the time synchronization in the one-frame units, accurately grasping a correlation between the movement of the measurement target and the data (the measurement information) by the user becomes possible. A Global Positioning System (GPS) exists as an example of a module capable of accurate time synchronization, but in addition to issues such as large size of the apparatus and enormous cost, the GPS is unable to acquire the current time or accomplish time synchronization indoors. With the image processing system 1, accurate time synchronization can be accomplished even indoors.

With the image processing system 1, the video and the data or the evaluation values can be displayed simultaneously, overlapping or lined up on the screen, after the time synchronization. By simultaneously displaying the video information and the data or the evaluation values overlapping or lined up, the user can be caused to simultaneously see a motion of a body of the measurement target from the video information and the measurement data obtained from the measurement target, and the user can easily accomplish the guidance and the evaluation of the movement of the measurement target.

With the image processing system 1, even when a plurality of measuring apparatuses 100 are used, specifying the respective measuring apparatuses 100 is possible through the sensor ID 403 included in the visible light signal 400. Through this, for example even when multiple people are moving and respectively wearing the measuring apparatuses 100, from which measurement target the data was obtained can be easily specified, and guiding the movement of the multiple people can be easily accomplished.

(Second Exemplary Embodiment)

Below, an image processing system 1 according to a second exemplary embodiment of the present disclosure is described with reference to the drawings. Same or corresponding parts in the drawings are labelled with the same reference symbols.

The sensor 102 of the measuring apparatus 100 includes a geomagnetic sensor. The sensor 102 measures geomagnetism and stores the measured data in the memory 105.

Figure 10A:
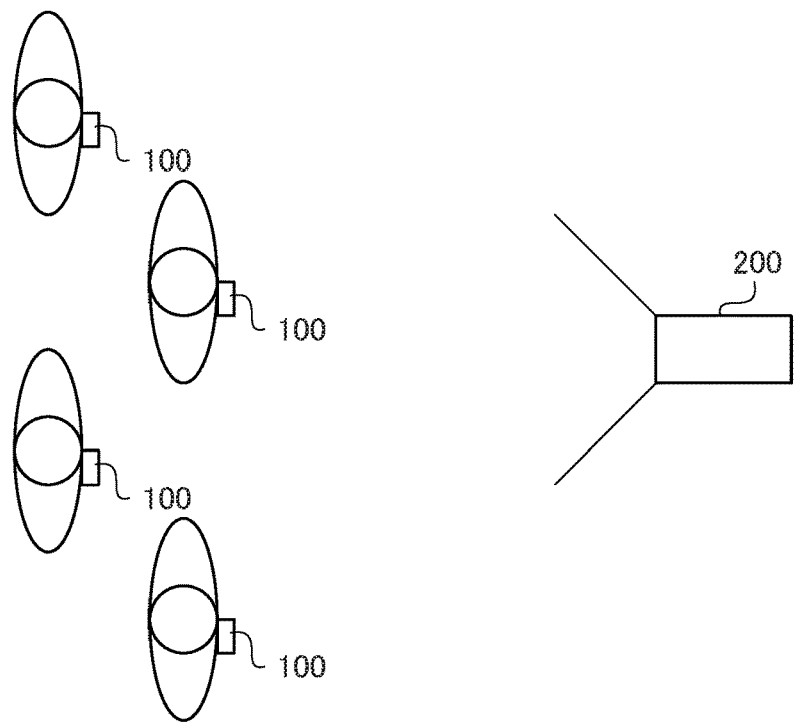
FIG. 10A is a drawing for describing an example of a measurement start time, in an image processing system according to a second exemplary embodiment.
Figure 10B:
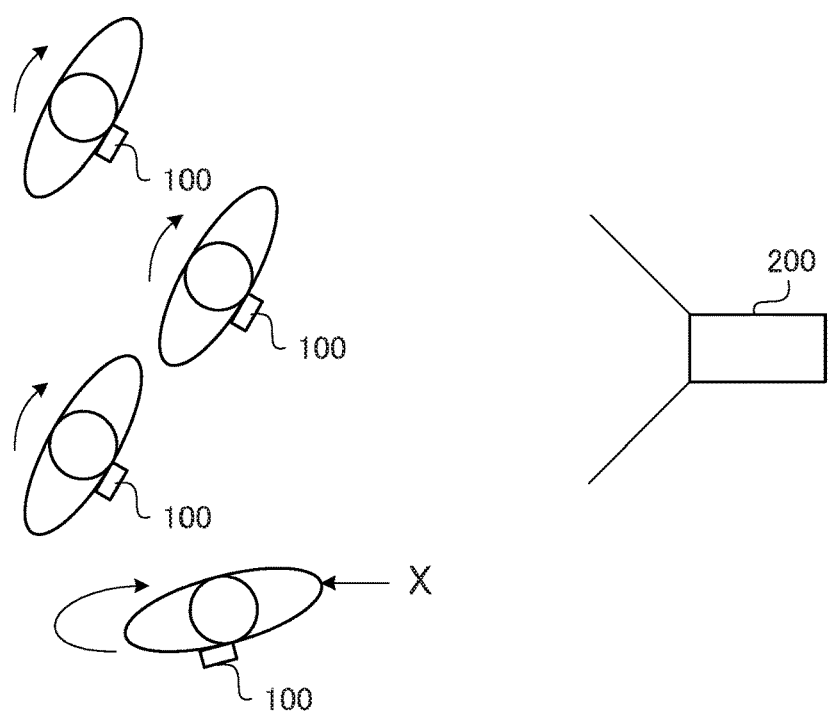
FIG. 10B is a drawing for describing an example in which an angular displacement exceeded a threshold value, in the image processing system according to the second exemplary embodiment.

FIGS. 10A and 10B are drawings for explaining the actions of the image processing system 1 according to the second exemplary embodiment. As shown in FIG. 10A, when the sensor 102 begins measuring, the analyzer 103 analyzes the geomagnetism measured and the geomagnetism at a start of measurements, and calculates an angular displacement of the measurement target. The controller 101 analyzes whether or not the angular displacement calculated exceeds a threshold value. In this exemplary embodiment, the threshold value for the angular displacement is ±60 degrees.

When the angular displacement of the measurement target does not exceed the threshold value, transmission of the visible light signal 400 by the light emitter 106 is continued. As shown by a measurement target X in FIG. 10B, when a determination is made that the threshold value has been exceeded, the controller 101 controls the light emitter 106 and stopes transmission of the visible light signal 400. In addition, after the determination is made that the threshold value has been exceeded, when a new determination is made that the angular displacement does not exceed the threshold value, the controller 101 controls the light emitter 106 and the transmission of the visible light signal 400 that was halted is restarted.

When the angular displacement of the measuring apparatus 100 becomes large, emission of light by the light emitter 106 is difficult for the capturing apparatus 200 to capture. In such cases, light emission by the light emitter 106 is pointless, and leads to a waste of energy and a shortening of life. In addition, the visible light signal 400 transmitted from the measuring apparatus 100 is not captured by the capturing apparatus 200, so data is lost.

The image processing system 1 according to this exemplary embodiment halts the transmission when the angular displacement of the measuring apparatus 100 exceeds the threshold value, and through this can prevent pointless light emission and can prevent the waste of the energy and the shortening of the life. In addition, data being lost because the visible light signal 400 is not captured by the capturing apparatus 200 can be prevented.

(Variation)

Above, several numbers of exemplary embodiments of the present disclosure were described, but the first exemplary embodiment and the second exemplary embodiment are merely examples and a scope of applications of the present disclosure is not limited thereby. That is to say, various applications of the exemplary embodiments of the present disclosure are possible, and all embodiments are included within the scope of the present disclosure.

Figure 11:
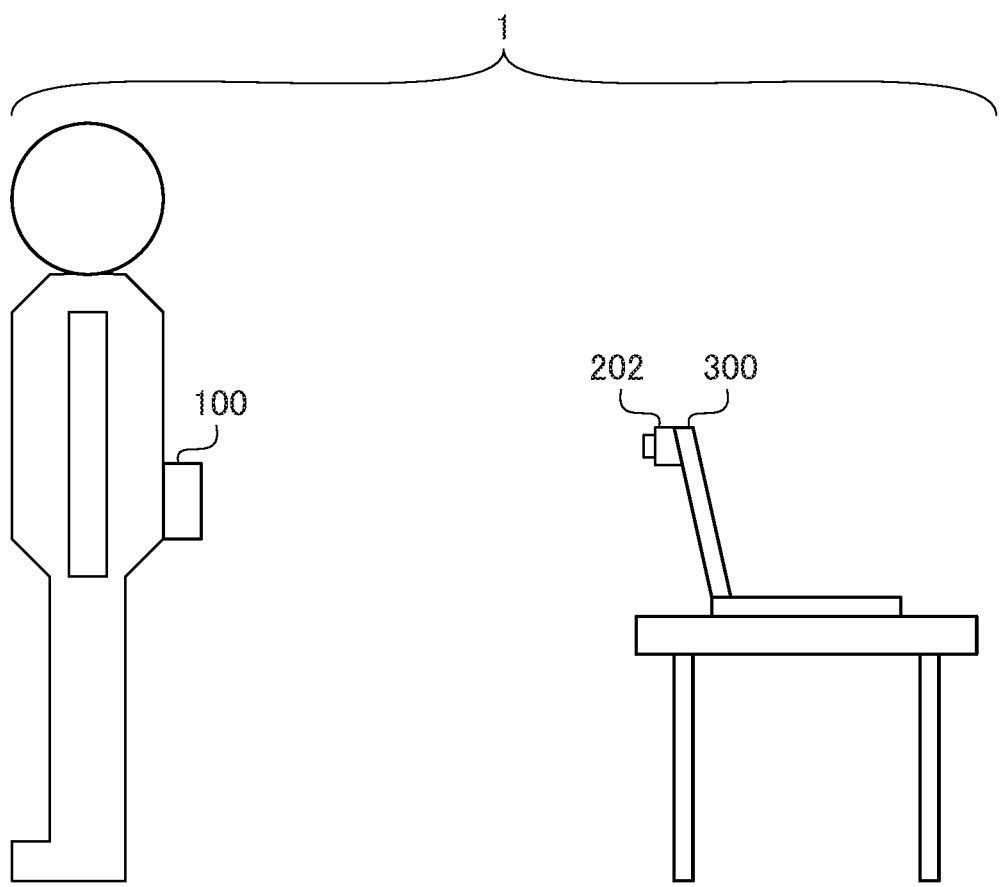
FIG. 11 is a schematic drawing showing a configuration of an image processing system according to a variation.

The image processing system 1 was described as comprising the measuring apparatus 100, the capturing apparatus 200 and the image processing apparatus 300, but this is intended to be illustrative and not limiting. FIG. 11 is a schematic diagram showing a configuration of an image processing system according to a variation. As shown in FIG. 11, the image processing system 1 does not comprise the capturing apparatus 200, but the image processing apparatus 300 comprises a capturer 202, and the image processing apparatus 300 may comprise the functions of the capturing apparatus 200. In addition, the image processing system 1 need not comprise the image processing apparatus 300, but the capturing apparatus 200 may comprise the functions of the image processing apparatus 300.

The light emitter 106 was taken to be the light emitting apparatus for visible light, but this is intended to be illustrative and not limiting. Electromagnetic waves emitted by an electromagnetic waves emitting apparatus that can be captured by the capturing apparatus 200 may be used, and for example, an infrared ray emitting apparatus would be fine. Similarly, in the present specification, the explanation was for the visible light communication or the visible light signal, but the apparatus is not limited to using only visible light.

The communicator 107 was described as the communication device for accomplishing the wireless communication, but this is intended to be illustrative and not limiting. For example, the communicator 107 may be a communication device comprising a Universal Serial Bus (USB) module and may accomplish wired communication. In addition, data may be stored on a removable storage device and data may be exchanged by causing such to be read by other devices. The same is also true for the communicator 204 and the communicator 302. In this case, the video information is obtained from the removable storage device.

In addition, the measuring apparatus 100 need not comprise the communicator 107. Even if the apparatus does not comprise the communicator 107, displaying the video information and the measurement information is possible by transmitting the measurement information via the light emitter 106 and the capturer 202 of the capturing apparatus 200 capturing such.

In the visible light communication, one frame of the video information corresponded to one bit of the signal, but this is intended to be illustrative and not limiting. For example, a flashing time may be set so that two frames of the video information become one bit of the signal. With such settings, the communication speed becomes half, but preventing flashing from being lost by not being recorded in the frame of the video information becomes possible.

The visible light signal 400 was taken to include the header flag 401, the measurement time 402, the sensor ID 403, the analysis data 404 and the alert flag 405, but this is intended to be illustrative and not limiting. For example, the visible light signal 400 may include only the header flag 401 and the measurement time 402. In addition, the visible light signal 400 may not include the measurement time 402 and may include at least one out of the sensor ID 403, the analysis data 404 and the alert flag 405. If the measurement data 402 is included at least one time in the visible light signal 400 transmitted a plurality of times, the image processing system 1 can accomplish the time synchronization of the video information and the measurement data.

The analysis data 404 was taken to show the evaluation value obtained by the analyzer 103 of the measuring apparatus 100 analyzing data, but this is intended to be illustrative and not limiting. For example, the analysis data 404 may also include as measurement information the very data measured by the sensor 102 of the measuring apparatus 100.

The visible light signal 400 may include an end flag at an end of the signal. The end flag is a 32-bit signal indicating the end of the visible light signal 400. The acquirer 303 recognizes that the visible light signal 400 has ended through the presence of the end flag.

The image processing system 1 was taken to accomplish the synchronization process as image processing, but this is intended to be illustrative and not limiting. For example, the visible light signal 400 may not contain the measurement time 402 and image processing may be accomplished without accomplishing the time synchronization. If the analysis data 404 is included in the visible light signal 400, displaying the measurement information and the video information is possible by capturing the visible light signal 400 and receiving the video information.

In the image processing system 1 according to the second exemplary embodiment, when the end flag is included in the visible light signal 400, the light emitter 106 restarts from the header flag 401 transmission of the visible light signal 400 that was halted. By restarting transmission from the header flag 401, causing the visible light signal 400 to be recognized with certainty by the acquirer 303 becomes possible. When the acquirer 303 has not received the visible light signal 400 for at least a prescribed time (for example, one second), even if the end flag has not been received, the acquirer 303 determines that transmission was interrupted and prepares for restarting of the visible light signal 400.

A configuration for realizing the functions according to the present disclosure can naturally be provided as an image processing system prepared in advance, and an existing information processing apparatus and/or the like can also be caused to function as an image processing system according to the present disclosure through application of programs. That is to say, by making programs for causing the various functional configurations of the image processing system 1 illustrated by the first exemplary embodiment and the second exemplary embodiment to be realized executable by a CPU and/or the like that controls the existing information processing apparatus and/or the like, causing the existing system to function as the image processing system according to the present disclosure becomes possible. In addition, the image processing method according to the present disclosure can be implemented using the image processing system.

In addition, the method of applying this kind of program is arbitrary. Application is possible by storing the program on a non-transitory computer-readable memory medium such as a flexible disk, a compact disc (CD)-ROM, a digital versatile disc (DVD)-ROM, a memory card and/or the like. Furthermore, the program can be overlaid on carrier waves and applied via a communication medium such as the Internet and/or the like. For example, the program may be posted on and distributed via a bulletin board system (BBS) on a communication network. Furthermore, the configuration may be such that the above-described processes can be executed by activating this program under the control of an operating system (OS) and executing the program the same as other application programs.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An image processing apparatus comprising:
   an obtainer for obtaining video information including video of a measurement target and a visible light signal that includes a measurement time and measurement information for the measurement target measured by a measuring apparatus attached to the measurement target, the visible light signal being emitted by the measuring apparatus; and
   an acquirer for acquiring the measurement time and the measurement information from the visible light signal included in the video information obtained by the obtainer, and for synchronizing the measurement information and the video information based on the measurement time acquired,
   wherein:
   the measurement time indicates an elapsed time from when the measuring apparatus began measuring; and
   the acquirer synchronizes the measurement information and the video information by specifying a second time, which is before a first time by the elapsed time indicated by the measurement time, and by specifying a frame of the video information captured at the specified second time, wherein the first time corresponds to a beginning of the measurement information in the visible light signal in the video information.

2. The image processing apparatus according to claim 1, wherein the obtainer is a capturer for capturing the video information.

3. The image processing apparatus according to claim 1, wherein the obtainer is a receiver for receiving the video information from a capturing apparatus that captures the video information.

4. The image processing apparatus according to claim 1, further comprising a display for simultaneously displaying the video information obtained by the obtainer and the measurement information acquired by the acquirer.

5. The image processing apparatus according to claim 1, wherein:
   the obtainer obtains the video information including the visible light signal that further includes identification information identifying the measuring apparatus; and
   the acquirer acquires the identification information from the visible light signal included in the video information obtained by the obtainer.

6. The image processing apparatus according to claim 1, wherein the obtainer obtains the video information including the visible light signal that further includes an evaluation value calculated by the measuring apparatus analyzing the measuring information.

7. The image processing apparatus according to claim 4, wherein:
   the obtainer obtains the video information including the visible light signal that further includes an alert flag indicating that an evaluation value calculated by the measuring apparatus analyzing the measurement information exceeds a threshold value;
   the acquirer acquires the alert flag from the visible light signal included in the video information obtained by the obtainer; and
   the display displays with highlights a part including the measuring apparatus in the video information, when the acquirer has acquired the alert flag.

8. The image processing apparatus according to claim 4, further comprising a receiver for receiving instructions for selecting a specific measuring apparatus from among a plurality of the measuring apparatuses; and
   the display simultaneously displays the video information and the measurement information of the measurement target to which the selected specific measuring apparatus is attached.

9. The image processing apparatus according to claim 1, wherein the measuring information includes movement information acquired by the measuring apparatus from the measurement target that is moving.

10. The image processing apparatus according to claim 1, wherein the measurement information includes biological information acquired by the measuring apparatus from the measurement target.

11. The image processing apparatus according to claim 1, wherein the measurement information includes environment information acquired by the measuring apparatus from an environment surrounding the measurement target.

12. The image processing apparatus according to claim 1, wherein the visible light signal includes a flashing pattern of visible light.

13. The image processing apparatus according to claim 1, wherein the visible light signal includes a plurality of visible lights which have different wavelengths.

14. An image processing system, comprising:
a measuring apparatus attached to a measurement target, the measuring apparatus measuring a measurement time and measurement information of the measurement target and emitting a visible light signal including the measurement time and the measurement information measured; and
an image processing apparatus including:
  an obtainer for obtaining video information that includes the visible light signal and video of the measurement target; and
  an acquirer for acquiring the measurement time and the measurement information from the visible light signal included in the video information obtained by the obtainer, and for synchronizing the measurement information and the video information based on the measurement time acquired,
wherein:
the measurement time indicates an elapsed time from when the measuring apparatus began measuring; and
the acquirer of the image processing apparatus synchronizes the measurement information and the video information by specifying a second time, which is before a first time by the elapsed time indicated by the measurement time, and by specifying a frame of the video information captured at the specified second time, wherein the first time corresponds to a beginning of the measurement information in the visible light signal in the video information.

15. An image processing method comprising:
obtaining video information including video of a measurement target and a visible light signal that includes a measurement time and measurement information for the measurement target measured by a measuring apparatus attached to the measurement target, the visible light signal being emitted by the measuring apparatus; and
acquiring the measurement time and the measurement information from the visible light signal included in the video information obtained, and synchronizing the measurement information and the video information based on the measurement time acquired,
wherein:
the measurement time indicates an elapsed time from when the measuring apparatus began measuring; and
the synchronizing of the measurement information and the video information comprises specifying a second time, which is before a first time by the elapsed time indicated by the measurement time, and by specifying a frame of the video information captured at the specified second time, wherein the first time corresponds to a beginning of the measurement information in the visible light signal in the video information.

16. A non-transitory computer-readable recording medium on which is recorded a program for controlling a computer of an image processing apparatus to execute processing comprising:
an obtaining process for obtaining video information including video of a measurement target and a visible light signal that includes a measurement time and measurement information for the measurement target measured by a measuring apparatus attached to the measurement target, the visible light signal being emitted by the measuring apparatus; and
an acquiring process for acquiring the measurement time and the measurement information from the visible light signal included in the video information obtained, and for synchronizing the measurement information and the video information based on the measurement time acquired,
wherein:
wherein:
the measurement time indicates an elapsed time from when the measuring apparatus began measuring; and
the acquiring process synchronizes the measurement information and the video information by specifying a second time, which is before a first time by the elapsed time indicated by the measurement time, and by specifying a frame of the video information captured at the specified second time, wherein the first time corresponds to a beginning of the measurement information in the visible light signal in the video information.

17. An image processing method comprising:
obtaining video information including video of a measurement target and a visible light signal that includes a measurement time and measurement information for the measurement target measured by a measuring apparatus attached to the measurement target and an alert flag indicating that an evaluation value calculated by the measurement apparatus analyzing the measurement information exceeds a threshold value, the visible light signal being emitted by the measuring apparatus;
acquiring the alert flag, the measurement time, and the measurement information from the visible light signal included in the video information obtained, and synchronizing the measurement information and the video information based on the measurement time acquired; and
displaying simultaneously, the synchronized video information and the measurement information,
wherein:
the displaying displays with highlights a part including the measuring apparatus in the video information, when the alert flag has been acquired in the acquiring,
the measurement time indicates an elapsed time from when the measuring apparatus began measuring; and
the synchronizing of the measurement information and the video information comprises specifying a second time, which is before a first time by the elapsed time indicated by the measurement time, and by specifying a frame of the video information captured at the specified second time, wherein the first time corresponds to a beginning of the measurement information in the visible light signal in the video information.

* * * * *

UNITED STATES PATENT AND TRADEMARK OFFICE
CERTIFICATE OF CORRECTION

PATENT NO. : 10,389,444 B2
APPLICATION NO. : 15/269908
DATED : August 20, 2019
INVENTOR(S) : Tomoaki Nagasaka et al.

It is certified that error appears in the above-identified patent and that said Letters Patent is hereby corrected as shown below:

In the Specification

Column 16, Line 15, delete "wherein:".

Signed and Sealed this
Seventh Day of January, 2020

Andrei Iancu
*Director of the United States Patent and Trademark Office*